Patented Feb. 21, 1950

2,498,343

UNITED STATES PATENT OFFICE 2,498,343

DENTURE CLEANSERS

Theodore H. Rider, Hinsdale, and Fred L. Humoller and Solomon D. Gershon, Chicago, Ill., assignors to Lever Brothers Company, Cambridge, Mass., a corporation of Maine No Drawing. Application August 10, 1944, Serial No. 548,934

7 Claims. (Cl. 252—103)

Our invention relates to cleansers for the cleansing of artificial dentures such as dental plates, orthodontia plates and like structures which, in use, accumulate deposits of mucin, food debris, calculus, tobacco stains, and the like.

Numerous types of artificial denture cleansers have heretofore been suggested but, to our knowledge, all of them have been subject to one or more serious disadvantages which have militated against their more widespread use and acceptance. Thus, for example, certain of the cleansers which have been proposed contain a relatively high proportion of acids, such as hydrochloric acid, which have a corrosive effect upon metallic portions of the dentures and introduce problems of handling and packaging. Such cleansers, as well as others, have required, in their use, the brushing of the dentures in order reasonably effectively to remove the undesired deposits thereon. Certain cleansers have been marketed wherein the denture is simply immersed in a solution of the cleansing composition, removed therefrom, and then rinsed in water. Such latter cleansers, which depend primarily upon relatively high alkalinity to produce a cleansing action, do not function as effectively as may be desired and, in any case, require an undue period of time of immersion of the denture in order to obtain reasonably satisfactory results. Other disadvantages have characterized such known cleansers with which those versed in the art are familiar and which, therefore, require no elaboration.

In accordance with our present invention, novel denture cleansers have been evolved which overcome disadvantages such as those which have been characterized above. Denture cleansers made pursuant to our present invention are exceptionally satisfactory in their action upon mucin deposits, in their removal of stains, and in their mechanical cleansing action, accomplishing such in a short period of time. The denture cleansing compositions, which are in the form of powdered materials, are stable and may be packaged in suitable containers.

In general, the denture cleansing compositions of our invention comprise an alkali metal percarbonate, the term "alkali metal" being intended to include sodium, potassium, ammonium and lithium, in admixture with certain other ingredients, as described in detail hereafter, the compositions being so compounded and, preferably buffered, that, when dissolved in water for use for cleansing dentures, they produce a pH falling within certain defined limits and maintain their pH within such limits.

In order that those skilled in the art may fully understand the nature of our present invention, the following illustrative examples are given. It will be understood that various changes may be made therein as, for example, in the proportions of the ingredients and the omission or inclusion of certain ingredients, without departing from the spirit of our invention, as will be clear in the light of the guiding principles which are disclosed herein.

Example 1

| | Grams |
|---|---|
| Sodium percarbonate ($2Na_2CO_3 \cdot 3H_2O_2$) | 1,000.0 |
| Sodium carbonate (anhydrous) | 752.0 |
| Sodium bicarbonate | 188.0 |
| Sodium sulphate (anhydrous) | 39.6 |
| Sodium hexametaphosphate | 20.0 |
| F. D. & C. Orange 1 | 0.2 |
| Sodium lauryl sulphate | 0.2 |

The above-listed ingredients are mixed to produce a homogeneous admixture and then screened to produce a powder of desired mesh size, for example, about 60 mesh. A 2% solution in water produces a pH of 10.3. The compositions described in the examples given below are prepared in a manner similar to that described in Example 1.

Example 2

| | Grams |
|---|---|
| Sodium percarbonate ($2Na_2CO_3 \cdot 3H_2O_2$) | 300.0 |
| Sodium carbonate (anhydrous) | 800.0 |
| Sodium bicarbonate | 200.0 |
| Sodium sulphate (anhydrous) | 580.0 |
| Sodium hexametaphosphate | 100.0 |
| Phenolphthalein | 0.12 |
| Activating agent [1] | 20.0 |

A 2% solution in water produces a pH of 10.3.

[1] The activating agent, which comprises a cobalt complex coated with stearic acid, is prepared as follows:
A solution of 1.6 g. of cobaltous chloride ($CoCl_2 \cdot 6H_2O$) in 12 ml. of 95% ethanol is poured over 14.4 g. of sodium citrate, U. S. P. XII. The mixture is thoroughly stirred while the alcohol evaporates and then ground to a fine powder which is suspended in a saturated solution of stearic acid in trichloroethylene. After a few minutes of agitation, the suspension is filtered and the solid material exposed to a stream of air to facilitate evaporation of the trichloroethylene. This coating procedure is repeated a second time and the final product dried and carefully screened.

Example 3

| | Grams |
|---|---|
| Sodium percarbonate ($2Na_2CO_3.3H_2O_2$) | 150 |
| Sodium sulphate (anhydrous) | 200 |
| Sodium carbonate (anhydrous) | 360 |
| Sodium bicarbonate | 90 |
| Sodium hexametaphosphate | 50 |
| Activating agent [1] | 150 |

A 2% solution in water produces a pH of 10.4.

[1] The activating agent, which comprises a cobalt complex coated with benzoic acid, is prepared as follows:

1.16 g. of cobaltous chloride ($CoCl_2.6H_2O$) are dissolved in 20 ml. of 95% ethanol and then 60 ml. of ethyl ether are added. The resulting deep blue solution is poured over a mixture of 19.4 g. of gluconolactone and 79.0 g. anhydrous sodium sulphate. The mixture is stirred thoroughly while the solvent evaporates. When most of the solvent has evaporated a pink mass is obtained which, upon being placed into an oven at 100° C. for a few minutes, turns blue in color. The material so obtained is suspended in a 10% solution of benzoic acid in ethylene dichloride. The suspension is thoroughly stirred and filtered. The last traces of the solvent are removed by placing the material into an oven at 85° C. for a short time. The material, when completely freed from ethylene dichloride, is then mixed thoroughly with the 200 g. of anhydrous sodium sulphate.

Example 4

| | Grams |
|---|---|
| Sodium percarbonate ($2Na_2CO_3.3H_2O_2$) | 30.0 |
| Sodium carbonate (anhydrous) | 80.0 |
| Sodium bicarbonate | 20.0 |
| Sodium hexametaphosphate | 2.0 |
| Sodium sulphate (anhydrous) | 65.0 |
| Phenolphthalein | 0.012 |
| Activating agent [1] | 3.0 |

A 2% solution in water produces a pH of 10.3.

[1] The activating agent, which comprises a cobalt complex coated with stearic acid, is prepared as follows:

8 g. of cobaltous chloride ($CoCl_2.6H_2O$) are ground to a fine powder and then mixed with 92.0 g. of anhydrous citric acid. The mixture is placed into an oven, kept at 100° C. and stirred. The cobaltous chloride melts and coats the particles of the citric acid. The activating agent is allowed to cool in the desiccator. 50 g. of the above mixture are placed into a crystallizing dish and 10 ml. of a saturated solution of stearic acid in trichloroethylene are poured over it and the activating agent stirred while the solvent is allowed to evaporate. Then 20 ml. of the saturated solution of stearic acid in trichloroethylene are poured over the activating agent. The mixture is stirred while the solvent evaporates.

Example 5

| | Grams |
|---|---|
| Sodium percarbonate ($2Na_2CO_3.3H_2O_2$) | 30.0 |
| Sodium carbonate (anhydrous) | 80.0 |
| Sodium bicarbonate | 20.0 |
| Sodium sulphate (anhydrous) | 65.0 |
| Sodium hexametaphosphate | 2.0 |
| Phenolphthalein | 0.024 |
| Activating agent [1] | 3.0 |

A 2% solution in water produces a pH of 10.3.

[1] The activating agent, which comprises a cobalt complex coated with ursolic acid, is prepared as follows:

16 g. of cobaltous chloride ($CoCl_2.6H_2O$) are dissolved in 70 ml. of 95% ethanol and then 100 ml. of ethyl ether are added. The resulting deep blue solution is then poured over 184.0 g. of sodium gluconate. The mixture is stirred constantly while the solvents are evaporated in a stream of air. The residue is placed into a desiccator overnight and is then mixed with an equal weight of anhydrous sodium sulphate and ground to a fine powder (1 g. is equivalent to 9.91 mg. cobalt). 40 g. of the material so prepared are then moistened with 15 ml. of a saturated solution of ursolic acid in trichloroethylene. The solvent is evaporated in a stream of air while the activating agent is stirred. Again, 15 ml. of the saturated solution of ursolic acid in trichloroethylene are poured over the material and the solvent allowed to evaporate. Finally, 30 ml. of the saturated solution of ursolic acid in trichloroethylene are poured over the activating agent and again the solvent is evaporated in a stream of air while the activating agent is thoroughly stirred.

While various alkali metal percarbonates may be employed within the broader phases of our invention, we have found that sodium percarbonate, sometimes called sodium carbonate peroxide, is especially satisfactory. It may be denoted by the formula $Na_2CO_3.1\frac{1}{2}H_2O_2$ or, alternately, $2Na_2CO_3.3H_2O_2$. It may very effectively be utilized in our denture cleansers without any added activating agent since a very substantial amount of active oxygen is liberated therefrom, on the addition of water, this being in sharp contrast to the situation with respect to various other known oxygen-liberating substances as, for example, perborates. Commercial sources of alkali metal percarbonates may, in certain cases, contain traces of iron or other impurities which may function to increase the liberation of active oxygen over that of pure percarbonates. Such commercial percarbonates may, of course, be used in the practice of our invention.

Various activating agents, other than those already described, may be utilized for liberating active oxygen from percarbonates, among which are, for example, manganese dioxide; finely powdered metals such as copper, platinum and iron; water-soluble halites and hypohalites as, for example, sodium chlorite and sodium hypochlorite; molybdates; hemin-type compounds; and enzymes such as catalase. We prefer to utilize such activating agents as are soluble in alkaline aqueous solutions, stable therein, and which do not form precipitates therein. They are preferably of such character that, when dissolved in water, they form transparent, practically colorless solutions in the concentrations in which they are used which, in addition to liberating available and active oxygen from the percarbonates, also act to increase the bleaching power of the percarbonate.

We have found that activating agents which are unusually satisfactory for our purposes may be prepared from metal salts the metallic radical of which is capable of existing in at least two states of oxidation and which is capable of forming, with certain organic compounds, stable alkali-soluble complexes. Thus, for example, iron, copper, and cobalt salts may be reacted with certain organic compounds, as disclosed below, to form complexes which are not only stable in alkaline media to form clear solutions but are also capable of causing marked activation of percarbonates with the resulting substantial and rapid liberation of active oxygen. Among the organic compounds capable of forming complexes with metallic radicals of the character mentioned above and which may be used for our purposes are certain alkylol amines such as triethanolamine and tripropanolamine. However, the most desirable efficiency is obtained with metallic complexes of hydroxy-acids and hydroxy-acid lactones, either as such or in the form of their alkali metal or other soluble salts. Mono-, di- and polyhydroxy, mono,- di- and polycarboxylic acids or lactones form complex ions with all of the desired characteristics in addition to possessing the feature of bringing about a marked increase in the rapidity of the bleaching action of the percarbonate. As an example of monohydroxy-monocarboxylic acid which is very satisfactory we mention glycollic acid. Malic acid is an illustrative example of a monohydroxy-dicarboxylic acid. Citric acid is a typical example of a monohydroxy-tricarboxylic acid. Mucic acid is an example of a tetrahydroxy-dicarboxylic acid. Sodium gluconate may be given as illustrative of a salt of a pentahydroxy-monocarboxylic acid. Gluconic acid lactone is an example of a pentahydroxy-monocarboxylic acid lactone. An example of a dihydroxy-dicarboxylic acid is tartaric acid. The above-mentioned hydroxy-carboxylic acids and lactones, it will be noted, are of aliphatic character, are unsubstituted, and contain up to 6 carbon atoms. We prefer particularly to use citric acid, alkali metal citrates, alkali metal gluconates or gluconic acid lactone for the purpose of forming complex ions with the metal ion thus forming activating agents which we may characterize, for example, as cobalto-citrate or cobalto-gluconate complexes. The degree of increase in bleaching power is dependent on the particular acid used. We have found that the cobalto-gluconate complex is one of the most effective activating agents for the liberation of available and active oxygen from the percarbonates. The cobalto-gluconate complex is particularly noteworthy in its increase in the bleaching power of the percarbonates, the decrease in time which it brings about for accomplishing bleaching, and its effect in reducing the amount of percarbonate which would otherwise be necessary to effect the desired bleaching action.

The addition of the activating agent to the solid alkali metal percarbonate tends to produce excessive rapidity of release of active oxygen from the percarbonate with resultant loss of active oxygen during shelf storage of the powdered denture cleanser. For this reason, it is highly advantageous to prepare the activating agent separately and to coat it with a substance capable of preventing interaction with the percarbonate as, for example, a substance of limited water solubility, preferably capable of forming alkali-soluble products. As examples of coating materials, reference is made to normally solid higher fatty acids and other carboxylic acids such as palmitic acid, stearic acid, benzoic acid and ursolic acid. These materials have limited solubility in water. In the presence of the alkaline solution produced by the denture cleanser components, soluble salts are formed with the resulting solution of the coating and liberation of the activating agent in a soluble form capable of producing active oxygen liberation. Insoluble materials such as cholesterol and ethyl cellulose may also be used, although less satisfactorily since they cause a slight turbidity in the solution. When added to water there is a slow diffusion of water through the coating with the resulting formation of a solution of the activating agent and final rupture of the coating, liberating the activating agent to exert its action.

We may also utilize coating agents which do not depend or do not solely depend for their effectiveness upon the physical barrier formation but, rather, upon producing localized conditions offsetting the activating effect of the activating agent. Thus, for example, the particles of activating agent may be coated with acid materials, for example, monosodium dihydrogen phosphate, glutamic acid hydrochloride, and the like or with substances such as amines, for example, amino acids such as glycine, tyrosine, and high molecular weight normally solid amines such as stearyl amine. The acid materials and the amine materials in high concentration both have an anti-activating effect upon the activity of the percarbonate. Thus, if the activating agent is coated with such materials and if the physical barrier is, in part, overcome by moisture, producing localized solutions, such localized solutions will contain either high acid or high amine concentrations and, under such conditions, the localized solutions will inhibit release of active oxygen from the percarbonate and thus preserve the activity of the percarbonate until a dilute solution has been achieved in which the anti-activating agents have been so reduced in concentration as no longer to prevent active release of the oxygen from the percarbonate.

The excessive tendency toward decomposition of the percarbonate during shelf storage in contact with the activating agent can also be overcome in other ways among which are the following:

1. Separately packaging the activating agent as, for example, in the form of small compressed tablets containing the activating agent, the latter to be dissolved in the solution of the percarbonate product which has been packaged as a bulk powder.

2. Coating the activating agent on an article which would serve as a stirring rod with instructions to add the powdered percarbonate to water and stir with the special stirring rod to obtain, simultaneously, solution of the powder and the activating agent.

For ease of manufacture and consumer use of the product, however, it is highly desirable to have an apparently homogeneous preparation in which the activating agent is in intimate mixture with the percarbonate but protected from the percarbonate by virtue of a surface coating.

As we have stated above, the denture cleansing composition is so compounded that the pH of a water solution thereof, and in which the denture is immersed for cleansing, as, for example, a 2% solution, is maintained in the range of 9.0 to 11.5 as determined by the Coleman standard glass electrode equipment. A more limited, preferred range, comprises compositions in which the pH of the aqueous solutions ranges from 10.0 to 10.6, and of especial utility are those compositions whose aqueous solutions are buffered so as to maintain a pH of about 10.2 to about 10.4. Various buffer salt mixtures may be employed for this purpose, a typical example of which is sodium carbonate and sodium bicarbonate in proper proportions, generally of the order of about 4 parts of sodium carbonate to 1 part of sodium bicarbonate. Phosphate buffers, such as, for example, alkali metal orthophosphates, tend to decrease the effectiveness of the denture cleansers and, therefore, they should not be present in large proportions. Where relatively large proportions of phosphate buffers are used, however, their tendency to decrease the effectiveness of the denture cleansers may be overcome by the use of proper amounts of activating agents.

The sodium hexametaphosphate forms a highly desirable ingredient of the denture cleanser compositions of our invention, serving to prevent the precipitation of calcium, magnesium and iron compounds resulting from the presence of calcium, magnesium and iron in the water, for example, ordinary tap water or well water as well as other hard waters which might be used. We have found that the sodium hexametaphosphate also serves to assist in the removal and solution of calculus-like deposits which accumulate on the dentures. In place of sodium hexametaphosphate, we may employ similar products such as alkali metal, particularly sodium, pyrophosphates, tetraphosphates and polyphosphates.

It will be noted that, in the composition of Example 1, we have disclosed the use of sodium lauryl sulphate. We have found that the use of wetting agents is very advantageous for our purposes. They function not only to enhance the wetting of the denture surfaces to be cleaned but they cause the liberation of the oxygen from the alkali metal percarbonates to occur in the form of highly desirable small bubbles. The liberation of oxygen in the form of large bubbles tends to lift relatively light-weight dentures to the top of the cleansing solution. Where, however, the bubbles are small, the denture remains at rest in the cleansing solution. Moreover, the liberation of the oxygen in the form of small bubbles produces a more effective cleansing of the denture and bleaching of the deposits on the denture. Other wetting agents which may be used to advantage are alkali metal or other soluble soaps; alkali metal or other soluble salts of the group of higher molecular weight alkyl sulphates, where the alkyl radical is a straight chain or branched chain containing from 8 to 18 carbon atoms; the corresponding alkyl sulphonates; sulpho-fatty acid and sulpho-dicarboxylic acid esters of aliphatic alcohols containing from 8 to 18 carbon atoms; sulphated and sulphonated fatty acid amides; sulphates and phosphates of higher molecular weight partial esters and partial ethers of aliphatic polyhydric alcohols; salts of alkylated aromatic sulphonates, and the like. Such wetting agents are sold under various trade names well known to those versed in the art. It will be understood that such wetting agents may be incorporated with advantage into any of the denture cleanser compositions made pursuant to the present invention. In those cases where the activating agents are coated with stearic acid or like soap-forming fatty acids, the soap formed by reaction of said acid with the alkali carbonate functions generally similarly to the synthetic wetting agents described above although not so satisfactorily.

As shown in Examples 1, 2, 4 and 5, the denture cleansing compositions may contain certain dyes. We have found that various dyes may be used as indicators of the length of time required to effect cleaning of the denture. The dry, powdered cleansing composition containing the selected dye, which composition in such form may be substantially white, produces a distinct coloration when dissolved in water for use in the cleansing of the denture. By proper selection of the dye, the color of the aqueous solution may be bleached out in a period of time approximately that required for cleaning the denture. The type of dye to be chosen will be clear to those versed in the art in the light of the disclosure of this phase of our invention. It will be understood that such selection will depend upon the exact composition of the denture cleanser employed and the concentration and type of the dye. By varying these factors, the period within which bleaching out of the dye will occur can be adjusted and be made to serve as an index of the desired length of the cleansing period. Among various suitable dyes, the following may be mentioned as illustrative: phenolphthalein, carmine, amaranth, and F. D. & C. Orange I. It is recognized that the use of phenolphthalein in mouth washes and dentifrices has heretofore been known, the phenolphthalein being employed to indicate the acidity or alkalinity in the mouth. This use of phenolphthalein, however, is in no wise related to the nature of its use in the denture cleansers of our present invention where, as stated above, it serves as an index of the proper length of time of the desired cleansing action upon the denture.

As we have pointed out above, the denture cleansers of our invention have good storage stability. This is clearly shown in the following table in relation to bleaching times:

Table

| | Bleaching Time (In Seconds) | | | |
|---|---|---|---|---|
| | As Prepared | 50° C. Storage | Room Temp. Storage | 80° Humidity Room Temp. Storage |
| Example 1 | 700 | 620 29 days | 710 29 days | 760 29 days |
| Example 4 | 640 | 500 25 days | | 483 25 days |
| Example 5 | 900 | | 930 15 days | 870 15 days |

The proportions of the various ingredients comprising our denture cleansers are subject to variation, as is apparent, for instance, from the illustrative examples set forth above. The percarbonate, in all cases, represents a substantial part of the dry, powdered compositions, ranging, in general, from about 7.5% to about 75%, particularly from about 15% to about 50%, by weight thereof. The buffer, where utilized, is employed in amounts sufficiently to maintain the pH of the solution within the prescribed limits set forth above. The sodium hexametaphosphate or similar pyrophosphates or polyphosphates, the wetting agent, the dye and the activating agent, where such are employed, are generally present in minor proportions. Sodium sulphate or similar fillers or diluents, where employed, may vary from small to relatively large proportions as indicated by the aforementioned examples. Illustrative compositions showing satisfactory proportions of ingredients, by weight, are as follows:

(a)

| | Per cent |
|---|---|
| Alkali metal percarbonate | 15 to 50 |
| Buffer | 40 to 50 |
| Sodium hexametaphosphate (or equivalent compound) | 0 to 5 |
| Sodium sulphate | 0 to 35 |
| Activating agent | 0 to 15 |

(b)

| | |
|---|---|
| Alkali metal carbonate | 15 to 50 |
| Sodium carbonate | 35 to 40 |
| Sodium bicarbonate | 8 to 12 |
| Sodium hexametaphosphate | 1 to 5 |

(c)

| | |
|---|---|
| Alkali metal percarbonate | 15 to 50 |
| Sodium carbonate | 35 to 40 |
| Sodium bicarbonate | 8 to 12 |
| Sodium hexametaphosphate | 1 to 5 |
| Sodium sulphate | 2 to 35 |
| Activating agent | 1 to 15 |
| Dye | Minor amounts |
| Wetting agent | Minor amounts |

In use for the cleansing of dentures, the composition is dissolved in water to form a dilute solution, the denture is immersed therein and allowed to remain for a desired period of time, for example, from 10 to 30 minutes. Thus, for example, two grams of any of the illustrative compositions shown in Examples 1, 2, 4 and 5 are placed in a half glassful of water, preferably lukewarm, and stirred well for a few seconds. The denture or bridgework or the like which is to be cleansed is placed into the solution. Tiny oxygen bubbles are liberated in the solution and on the denture. The original color of the solution disappears as cleansing is completed, the disappearance of the original color of the solution having been regulated to occur in from 10 to 30 minutes. The denture or bridgework or the like may, of course, be allowed to remain in the cleansing solution for longer periods of time without harm. After removal from the cleansing solution, the denture or bridgework or the like is rinsed thoroughly in water.

As we have stated, the cleansing period may be regulated by such means as inclusion or omission of activating agent, selection of activating denture, said ingredients being present in approximately the following percentages by weight:

| | Per cent |
|---|---|
| Sodium percarbonate | 15 to 50 |
| Buffer | 40 to 50 |
| Activating agent | 1 to 15 | said activating agent comprising a stable, alkali-soluble compound of at least one member selected from the group consisting of aliphatic unsubstituted hydroxy-carboxylic acids containing

UNITED STATES PATENTS

| Number | Name | Date |
|---|---|---|
| 1,471,987 | Vogt | Oct. 23, 1923 |
| 1,922,187 | Zisch | Aug. 15, 1933 |
| 2,035,267 | Fleischman | Mar. 24, 1936 |
| 2,035,896 | Kerwin | Mar. 31, 1936 |
| 2,069,157 | Sahyun | Jan. 26, 1937 |
| 2,170,052 | Heim | Aug. 22, 1939 |
| 2,245,495 | Pemble | June 10, 1941 |
| 2,266,835 | Webb | Dec. 23, 1941 |
| 2,275,979 | Molnar | Mar. 10, 1942 |
| 2,287,847 | Webb | June 30, 1942 |
| 2,304,098 | Jones | Dec. 8, 1942 |
| 2,362,487 | Hopkins | Nov. 14, 1944 |
| 2,372,402 | Stokes et al. | Mar. 27, 1945 |
| 2,409,718 | Snell | Oct. 22, 1946 |

FOREIGN PATENTS

| Number | Country | Date |
|---|---|---|
| 476,582 | Great Britain | Dec. 10, 1937 |
| 550,020 | Great Britain | Dec. 18, 1942 |
| 552,803 | Great Britain | Apr. 27, 1943 |
| 118,338 | Australia | Apr. 20, 1944 |